(12) United States Patent
Katagiri (10) Patent No.: US 6,243,023 B1
(45) Date of Patent: Jun. 5, 2001

(54) ENCODER AND PARAMETER ESTABLISHING DEVICE THEREFOR

(75) Inventor: Takashi Katagiri, Nagano (JP)

(73) Assignee: Sankyo Seiki Mfg. Co., Ltd., Nagano-ken (JP)

( * ) Notice: Subject to any disclaimer, the term of this patent is extended or adjusted under 35 U.S.C. 154(b) by 0 days.

(21) Appl. No.: 09/205,458

(22) Filed: Dec. 4, 1998

(30) Foreign Application Priority Data

Dec. 9, 1997 (JP) .................................................. 9-356245

(51) Int. Cl.$^7$ .................................................. G08C 15/06
(52) U.S. Cl. ............................... 340/870.03; 340/870.31; 340/870.35; 324/207.11; 324/207.18; 324/207.25; 318/661
(58) Field of Search ..................... 340/870.03, 870.11, 340/870.31, 870.35, 648, 635; 324/207.2, 207.11, 207.22, 207.23, 207.18, 207.25; 318/661

(56) References Cited

U.S. PATENT DOCUMENTS

| | | | |
|---|---|---|---|
| 4,646,088 | * | 2/1987 | Inoue ............................... 340/870.31 |
| 4,707,695 | * | 11/1987 | Takahashi et al. ............... 340/870.31 |
| 4,764,767 | * | 8/1988 | Ichikawa .......................... 340/870.31 |
| 4,779,075 | * | 10/1988 | Zagelein et al. ................. 340/870.31 |
| 4,855,734 | * | 8/1989 | Elsdoerfer ........................ 340/870.31 |
| 5,254,919 | * | 10/1993 | Bridges et al. ........................ 318/661 |
| 5,625,353 | | 4/1997 | Kitagiri et al. . |
| 5,815,089 | * | 9/1998 | Katagiri et al. ................. 340/870.02 |

* cited by examiner

Primary Examiner—Michael Horabik
Assistant Examiner—Timothy Edwards, Jr.
(74) Attorney, Agent, or Firm—Reed Smith LLP (57) ABSTRACT

An encoder comprises position detecting device for detecting a magnetic pole position and a rotational position of a motor. The encoder also includes a memory portion for storing parameter information particular to the motor or the position detecting device. A transmitting portion of the encoder is provided for externally transmitting parameter information particular to the position detecting device as a differential signal. A transmission suspension request detecting device is provided for detecting that the differential signal is driven by a given signal externally provided such that the differential signal does not exist as a transmission signal and for generating a transmission suspension request signal requesting suspension of transmission of the differential signal. Finally, a switching control device is provided for switching the transmitting portion to a transmission suspending condition based on the transmission suspension request signal provided by the transmission suspension request detecting device.

19 Claims, 7 Drawing Sheets

ENCODER AND PARAMETER ESTABLISHING DEVICE THEREFOR

BACKGROUND OF THE INVENTION a) Field of the Present Invention

The present invention relates to an encoder used for various motors and a parameter establishing device capable of establishing various bits of parameter information for the encoder from the outside of the encoder.

b) Description of the Related Art

Figure 8:
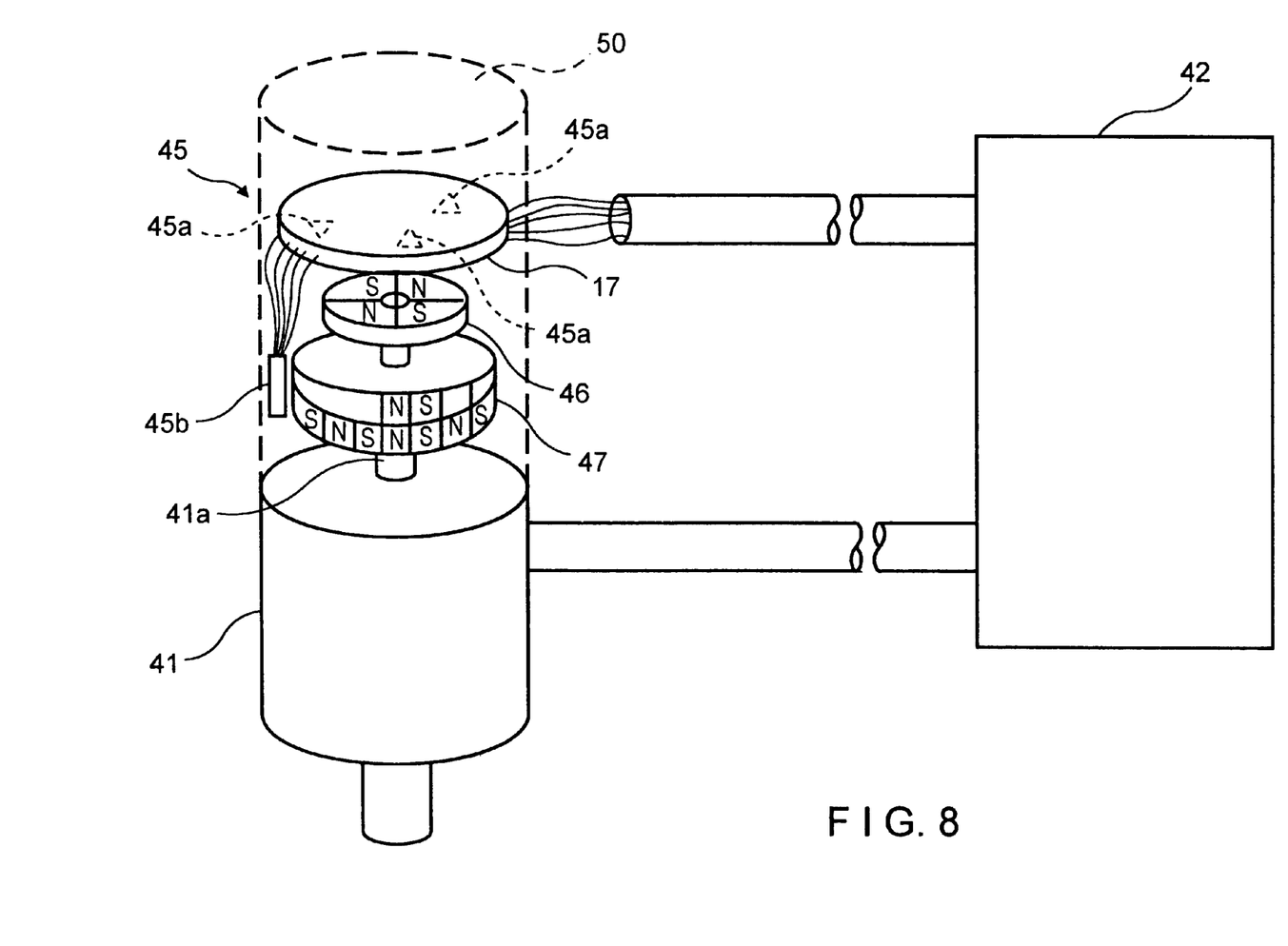

As shown in FIG. 8, a conventional servo motor comprises, for example, brushless motor 41, encoder 45, which separately detects data on a rotational position of brushless motor 41 and data on an absolute position of the motor's magnetic poles, and control device 42 which controls the driving of brushless motor 41 according to a detection signal from encoder 45. Also, cables are used for transmission of signals between encoder 45 and control device 42.

Encoder 45 is stored in case 50 as shown in FIG. 8 (indicated with a dotted line to avoid making the figure busy) wherein disc-shaped pole detecting magnet 46 is formed at the end of main shaft 41 a of brushless motor 41. Pole detecting magnet 46 transmits driving position data in association with U, V and W phases; also, it is magnetized in such a way that N and S poles, which are equivalent of magnetic poles of brushless motor 41, alternate around the circumference. In addition, drum-shaped magnetic recording medium 47 is formed between pole detecting magnet 46 and brushless motor 41. Magnetic recording medium 47 transmits rotational position data in association with Z, A and B phases; also, it consists of an upper portion, which is magnetized in such a way that a pair of N and S poles is positioned adjacent to each other at a position on the circumference, and a lower portion which is magnetized in such a way that N and S poles alternate around the circumference.

Furthermore, a plurality of Hall devices 45a and MR sensor 45b are positioned across from the magnetized areas of pole detecting magnet 46 and magnetic recording medium 47, respectively. Hall devices 45a are mounted on the reverse side of signal processor base 17 on which an encoder internal signal processor circuit is formed.

Hall devices 45a and MR sensor 45b generate pulses caused by rotation of brushless motor 41. Also, encoder 45 and control device 42 are connected to each other via cables such that control device 42 controls the driving of brushless motor 41 by using pulses from encoder 45.

In this case, brushless motor 41 can be of various modes; for example, ones with 50 W, 100 W to 1.1 kW and ones having two pairs or one pair of N and S poles of magnets. Also, depending on the use, encoder 45 itself can be such that 500 pulses or 1,000 pulses per rotation can be generated. Therefore, various combinations of brushless motor 41 and encoder 45 are possible.

However, conventional encoder 45 does not have a function to determine what kind of encoder shall be used according to kind of the brushless motor, that is, a self-diagnosing function. Hence, various parameters must be established during manufacturing of the encoder. Examples of such various bits of parameter information include the number of magnetic poles of brushless motor 41, the code indicating intensity of brushless motor 41 in watts, an identification number (ID) of encoder 45, codes indicating the manufacturing number, model, manufacturer and manufacturing date of encoder 45, codes assigning the number pulses per rotation in association with A and B phases of encoder 45, and a transmission format. The above various bits of parameter information are established on signal processor base 17 by a short pin or a dip switch; after the information is established, the cover of case 50 is closed.

Nonetheless, transmission of signals from encoder 45 and control device 42 in the above conventional servo motor is one-way transmission in which only output from encoder 45 to control device 42 is constantly generated. As a result, once the cover of case 50 of encoder 45 is closed after various bits of parameter information are established, the information in encoder 45 cannot be changed. Therefore, if there is a mistake in the selection of signal processor base 17 in encoder 45 or a mistake in the established parameter information, replacement of signal processor base 17 and reestablishment of the mistaken parameter information must be carried out by reopening the cover. This causes undesirable operations such that the cost of the servo motor is increased.

OBJECT AND SUMMARY OF THE INVENTION

Therefore, the present invention has, as its primary object, to provide an encoder in which various bits of parameter information in the encoder can be reestablished by electric operation from outside of the encoder while the cover of the encoder is closed and to provide a parameter establishing device in which various bits of parameter information of the encoder can be established from outside of the encoder.

In accordance with the invention, an encoder comprises position detecting means for detecting a magnetic pole position and a rotational position of a motor. The encoder also includes a memory portion for storing parameter information particular to the motor or the position detecting means. A transmitting portion of the encoder is provided for externally transmitting parameter information particular to the position detecting means as a differential signal. Transmission suspension request detecting means are provided for detecting that the differential signal is driven by a given signal externally provided such that the differential signal does not exist as a transmission signal and for generating a transmission suspension request signal requesting suspension of transmission of the differential signal. Finally, switching control means are provided for switching the transmitting portion to a transmission suspending condition based on the transmission suspension request signal provided by the transmission suspension request detecting means.

DESCRIPTION OF THE PREFERRED EMBODIMENTS

The following describes embodiments of the present invention in relation to drawings.

A servo motor in the following embodiments of the present invention has an almost identical structure as the one of the servo motor shown in FIG. 8; therefore, any detail explanations thereof are omitted herein.

The following describes an encoder according to an embodiment of the present invention in detail.

Encoder 1 of this embodiment, as mentioned above, is structured as an absolute encoder to separately detect rotational position data and pole position data in A, B, Z, U, V and W phases as some of various bits of parameter information. It comprises position detecting means 10 to detect the above rotational position data and the pole position data, and an encoder internal signal processor circuit to process detection signals from position detecting means 10.

Figure 1:
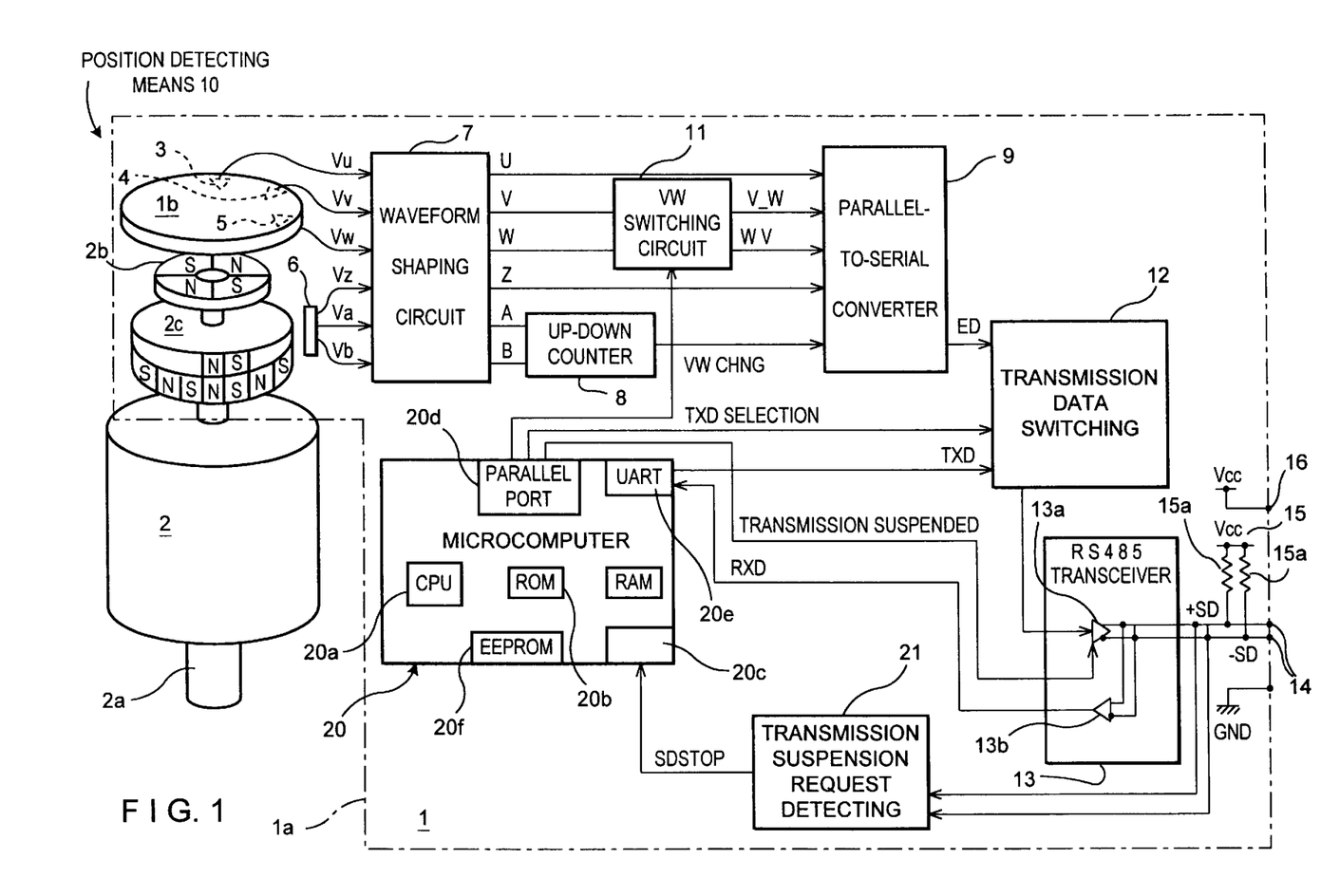
FIG. 1 is a block diagram showing a signal processing circuit in an encoder according to an embodiment of the present invention.

As shown in FIG. 1, encoder 1 is connected to the upper end surface of brushless motor 2 wherein disc-shaped pole detecting magnet 2b is mounted on one end (upper side in the figure) of main shaft 2a of brushless motor 2 to transmit driving position data of the U, V and W phases. The upper surface of pole detecting magnet 2b is magnetized such that the number of N and S poles are the same as the one of brushless motor 2, and the N and S poles alternate on the circumference at positions corresponding to the poles of brushless motor 2.

Figure 6:
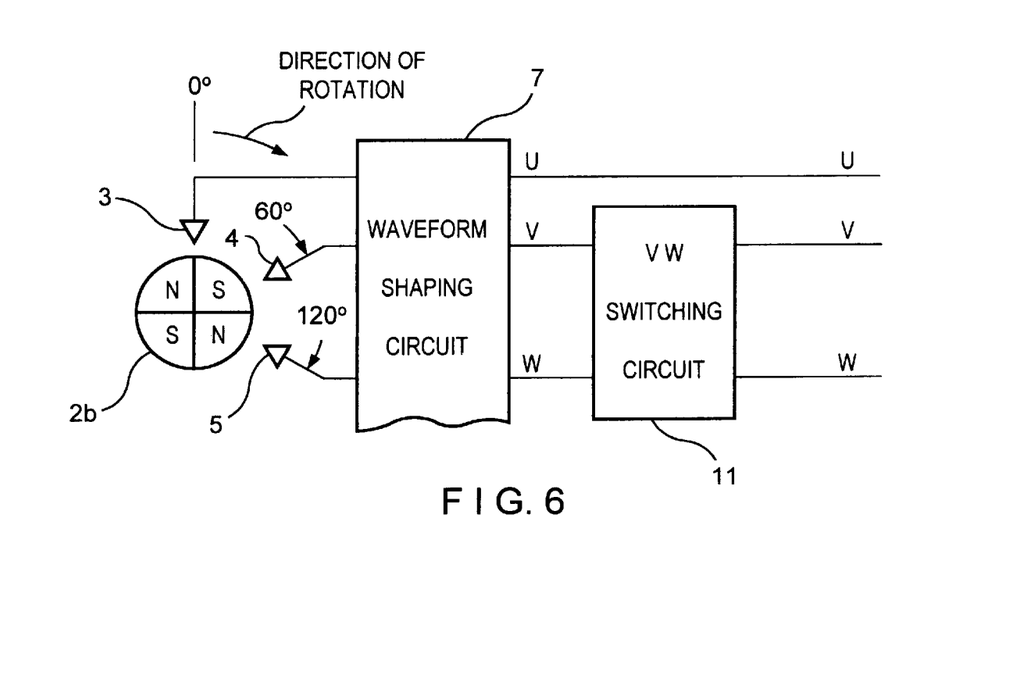
FIG. 6 is a figure showing a part on which Hall devices of an encoder using a pole detecting magnet for 4 poles are positioned.
Figure 7:
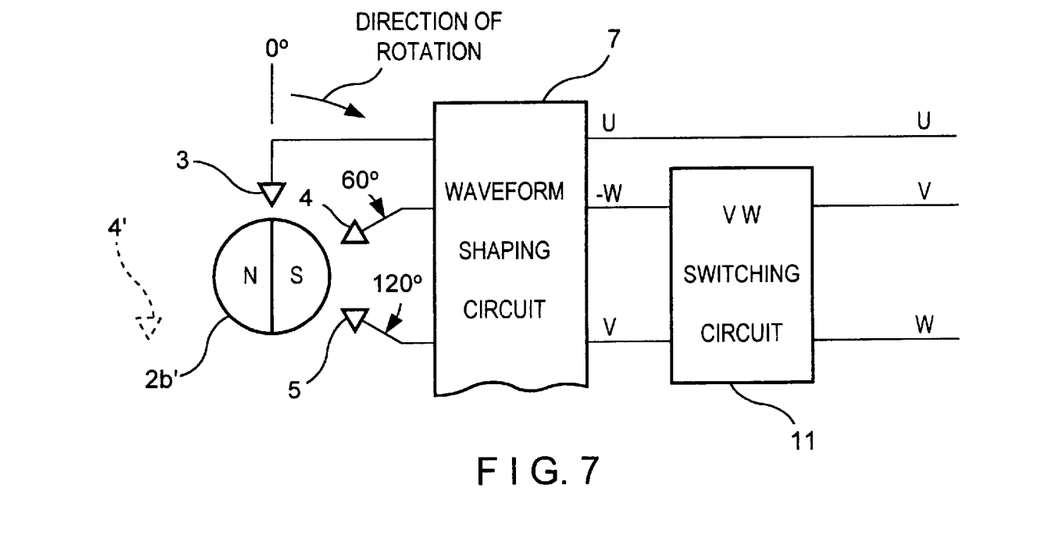
FIG. 7 is a figure showing a part on which Hall devices of an encoder using a pole detecting magnet for 2 poles are positioned; an FIG. 8 is a schematic figure showing an oblique view of a servo motor using an ordinary encoder.

Also, pole detecting magnet 2b for 4 poles is formed on encoder 1 corresponding to brushless motor 2 having 4 poles as shown in FIG. 6. As described later, pole detecting magnet 2b' for 2 poles is formed for a motor having 2 poles as shown in FIG. 7.

Returning to FIG. 1, cylindrical magnetic recording medium 2c is formed at the bottom of pole detecting magnet 2b. Magnetic recording medium 2c transmits position data of the Z, A and B phases; also, it consists of an upper portion, which is magnetized such a way that a pair of N and S poles is positioned adjacent to each other at a position on the circumference (as a source of position data of the Z phase), and a lower portion which is magnetized in such a way that a plurality of N and S poles alternate around the circumference (as a source of position data of the A and B phases).

Additionally, three Hall devices, first Hall device 3, second Hall device 4 and third Hall device 5, and MR sensor 6 are positioned at positions corresponding to magnetized portions of pole detecting magnet 2b and magnetic recording medium 2c inside case 1a of encoder 1 (the case is indicated by a dotted line to avoid making the figure busy). First through third Hall devices 3, 4 and 5 are mounted on the reverse side of signal processor base 1b on which the encoder internal signal processor circuit as described later is formed; also, they are positioned to face pole detecting magnet 2b in the axial direction.

The following describes the encoder internal signal processor circuit.

Three Hall devices, first through third Hall devices, 3, 4 and 5, as shown in FIG. 6, are positioned apart from each other by a mechanically measured angle of 60° in relation to pole detecting magnet 2b formed corresponding to brushless motor 2 having 4 poles. First through third Hall devices 3, 4 and 5 detect driving position signals for the motor $V_U$, $V_V$ and $V_W$ while MR sensor 6 detects sine-wave position signals $V_Z$, $V_A$ and $V_B$ which are shaped into rectangular waves by being fed to waveform shaping circuit 7.

Among output signals A, B, Z, U, V and W from waveform shaping circuit 7, signals A and B are fed to up-down counter 8 such that the output from up-down counter 8 is fed to parallel-to-serial converter 9. On the other hand, signals U and Z from waveform shaping circuit 7 are directly fed to parallel-to-serial converter 9; however, signal V and signal W from second Hall device 4 and third Hall device 5 respectively, are fed to VW switching circuit 11 of which the output is fed to parallel-to-serial converter 9.

VW switching circuit 11 is formed such that the number of poles of brushless motor 2 is switched between 4 and 2 while maintaining the positional relationships among Hall devices 3, 4 and 5. In the case of a motor having 4 poles, as shown in FIG. 6, signals V and W pass through without the switching operation.

On the other hand, in the case of using pole detecting magnet 2b' corresponding to a motor having 2 poles, as shown in FIG. 7, while maintaining the positions of Hall devices 3, 4 and 5 (apart by 60°), as described below, signals from second Hall device 4 and third Hall device 5 are different from signal V and signal W. Therefore, it is structured such that signal V and signal W, which are identical to the ones in the motor having 4 poles, can be obtained by performing a given signal operation. The following describes a detailed structure thereof.

Before discussing the structure of VW switching circuit 11, the following explains signals from second Hall device 4 and third Hall device 5 in the case of using pole detecting magnet 2b' for a motor having 2 poles as shown in FIG. 7.

For example, in the case of positioning the three Hall devices apart from each other by a mechanically measured angle of 120°, each of the Hall devices is positioned at positions of Hall devices 3, 5 and 4' and provides signal U, signal V and signal W as pole position data. In the case of positioning the three Hall devices apart from each other by a mechanically measured angle of 60°, that is, in the case of positioning them at positions of Hall devices 3, 4 and 5, the positions of first Hall device 3 and third Hall device 5 remain unchanged such that they provide signal U and signal V, respectively. On the other hand, second Hall device is positioned at a position 180° reverse of the position of Hall device 4' which is previously positioned at a mechanically measured angle of 120°; therefore, it provides signal _W (meaning reversed W) as a reversed output signal W of Hall device 4'.

Figure 4:
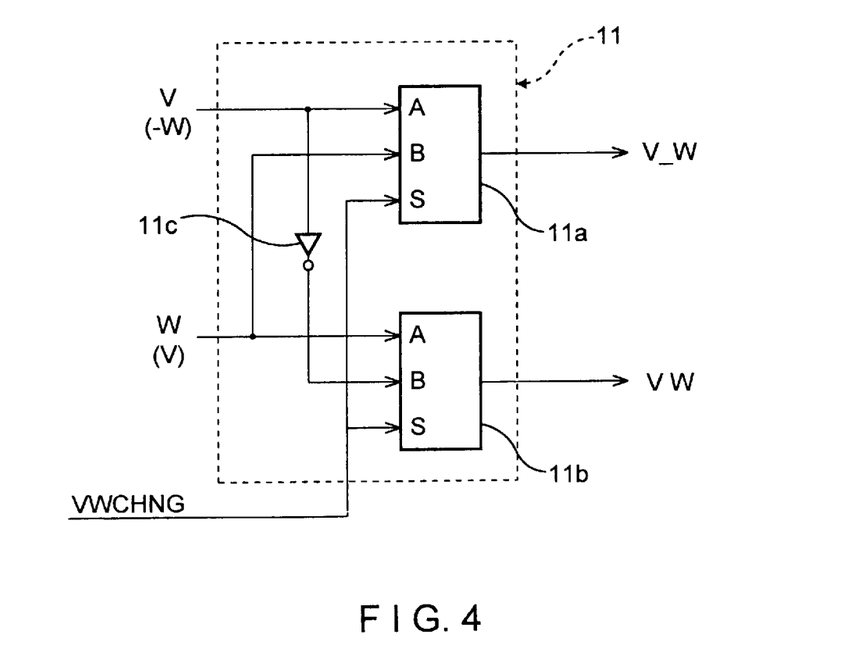
FIG. 4 is a configuration of the inside of a V, W switching means in FIG. 1.

Thereafter, as shown in FIG. 4, two data selectors, first and second data selectors 11a and 11b, are formed at VW switching circuit 11. Input port A in one of the data selectors (towards the top of the figure), first data selector 11a, receives output signal V (in the case of a motor having 4 poles) and output signal _W (in the case of a motor having 2 poles) from second Hall device 4 without any change. Furthermore, another input port B in first data selector 11a receives output signal W (in the case of a motor having 4 poles) and output signal V (in the case of a motor having 2 poles) from third Hall device 5 without any change.

On the other hand, input port A in the other data selector (towards the bottom of the figure), second data selector 11b, receives output signal W (in the case of a motor having 4 poles) and output signal V (in the case of a motor having 2 poles) from third Hall device 5 without any change. Also, the another input port B in second data selector 11b receives output signal _V (in the case of a motor having 4 poles) and output signal W (in the case of a motor having 2 poles), which are reversed output signal V (in the case of a motor having 4 poles) and output signal _W (in the case of a motor having 2 poles) from second Hall device 4 via inverter 11c.

Furthermore, a switching signal (VWCHANGE) described later is fed to ports S formed in both data selectors 11a and 11b. Based on the switching signal (VWCHANGE), some of the above signals fed to the ports A and B are selected such that the selected signals are provided through output ports V_W and VW formed in both data selectors 11a and 11b.

In other words, in the case of a motor having 4 poles, the input to each of ports A is selected to be provided as output as indicated by * in the upper row of Table 1 below. Also, signal V is provided from output terminal V_W of first data selector 11a (First Output in Table 1). Additionally, signal W is provided from output terminal V, W of second data selector 11b (Second Output in Table 1).

On the other hand, in the case of a motor having 2 poles, as indicated by * in the lower row of Table 1, the input to each of ports B is selected. Hence, signal V is provided from output terminal V_W of one of the data selectors (towards the top in the figure), first data selector 11a, in a similar manner as in the case of a motor having 4 poles (First Output in Table 1). Also, signal W is provided from output terminal V, W of the other data selector (towards the bottom in the figure), second data selector 11b, in a similar manner as in the above case of a motor having 4 poles (Second Output in Table 1).

In this embodiment, to simplify explanation, we discuss an embodiment of a parameter establishing device according to the present invention wherein the parameter information is reestablished by switching the number of poles of brushless motor 2, among various bits of parameter information, from 4 to 2.

Receiving line driver 13b of RS485 transceiver 13 as a transceiver means is connected to the output signal cables (±SD cables) for monitoring. A switching request signal (RXD) given from the outside of encoder 1 via the output signal cable is provided to switching control means (microcomputer) 20 via receiving line driver 13b. Transmission interface (UART) 20e has a function which ignores a normal signal from the output signal cables and which accepts an external signal as described later.

Furthermore, the output signal cables (±SD cables) in the vicinity of external output terminal 14 of encoder 1 are connected to power source 15 (Vcc) via resistors (15a, 15a) such that the electric potential of the output signal cables (±SD cables) is stabilized at the time of high impedance. Additionally, transmission suspension request detecting means 21 is connected to the output signal cables (±SD cables) such that a signal from the output signal cables (±SD cables) is constantly monitored. An output signal from transmission suspension request detecting means 21 is provided to switching control means 20.

Figure 3:
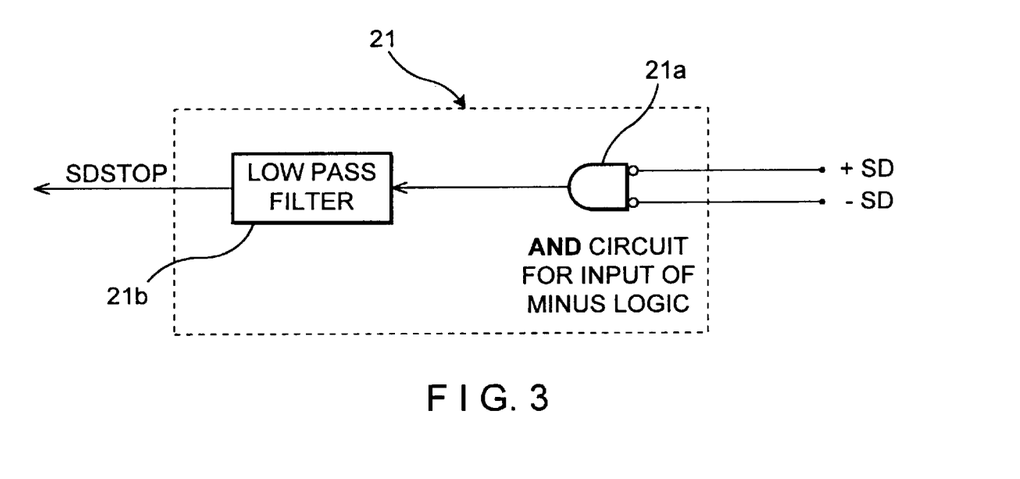
FIG. 3 is a configuration of the inside of a transmission suspension request detecting means in FIG. 1.

As shown in FIG. 3, AND circuit 21a for input of minus logic connected to the output signal cables (±SD cables) is formed in transmission suspension request detecting means 21. An output signal from AND circuit 21a for input of minus logic is provided to switching control means 20 via low pass filter 21b to remove noise. If short-out to the power supply or to the ground is caused by electric operation from the outside such that differential signals from each of the

TABLE 1

| # Poles | Switch Signal | First Output | | Second Output | | First Output | Second Output |
|---|---|---|---|---|---|---|---|
| 4 | 0 | A | V* | A | W* | V | W |
|   |   | B | W  | B | _V |   |   |
| 2 | 1 | A | _W | A | V  | V | W |
|   |   | B | V* | B | W* |   |   |

This embodiment, as shown above, is structured such that correct driving position data of the U, V and W phases can be constantly obtained by operation of VW switching circuit 11 in the case of either a motor having 4 poles or a motor having 2 poles. Therefore, as shown in FIG. 1, the driving position data of the U, V and W phases are fed to the input side of transmission data switching means 12 as an encoder serial signal (ED) together with position data of the Z, A and B phases via parallel-to-serial converter 9.

The output side of transmission data switching means 12 is connected to transmission line driver 13a formed in RS485 transceiver 13 as a transceiver means capable of transmission. Also, output signal cables (±SD cables) from transmission line driver 1 3a are connected to external output terminal 14 of encoder 1, through which a given signal is provided to the outside of encoder 1.

In encoder 1 of this embodiment, switching control means (microcomputer) 20 is positioned. Also, memory portion 20f is formed in switching control means 20 wherein information (one bit of parameter information) particular to brushless motor 2 is stored therein. This information can be reestablished by overwriting from the outside of encoder 1.

output signal cables (±SD cables) are at the same level of either low or high, transmission suspension request detecting means 21 recognizes the signals at the same level of either low or high as signals which cannot be recognized as transmission signals. As a result, a transmission suspension request signal (SESTOP) is provided from transmission suspension request detecting means 21 to switching control means 20.

Switching control means 20 comprises interrupt control portion 20c to receive transmission suspension request (SDSTOP) from transmission suspension request detecting means 21. An output signal from interrupt control portion 20c is processed at central processing unit ("CPU" hereafter) 20a by a given control program stored in ROM 20b. Interrupt control portion 20c has a function to perform output of a transmission suspension command signal (TXEN) from parallel port 20d of switching control means 20 via CPU 20a to transmission line driver 13a of RS485 transceiver 13 such that signals from the output signal cables (±SD cables) are at high impedance to cause a transmission suspension condition.

Also, switching control means 20 holds memory device (E²PROM) 20f as a memory portion by which contents therein can be stored while the power is turned off and which can be overwritten as many times as desired. Various bits of parameter information from external signals allowed at transmission interface 20e (UART), e.g. information regarding switching of the number of poles of a motor, are written onto memory device (E²PROM) 20f according to the control program in ROM 20b.

Additionally, the control program has a function to perform output of a selection command signal (TXDSEL) from parallel port 21b to transmission data switching means 12 based on various bits of parameter information given to transmission interface (UART) 20e from the outside, e.g. information regarding the switching of the number of poles of a motor. Also, the control program includes a program to select one of the input signals to perform output thereof and to perform output of V, W switching request signal (VWCHANGE) to VW switching circuit 11 such that either one of the detecting signals is provided from VW switching circuit 11. Furthermore, the control program in ROM 20b includes a program to perform output of a switching confirmation signal (TXD) to transmission data switching means 12 when the switching operation of VW switching circuit 11 is complete after overwriting on memory device (E²PROM) 20f based on parameter information given from the outside to transmission interface (UART) 20e, e.g. information regarding switching the number of poles of a motor.

Figure 2:
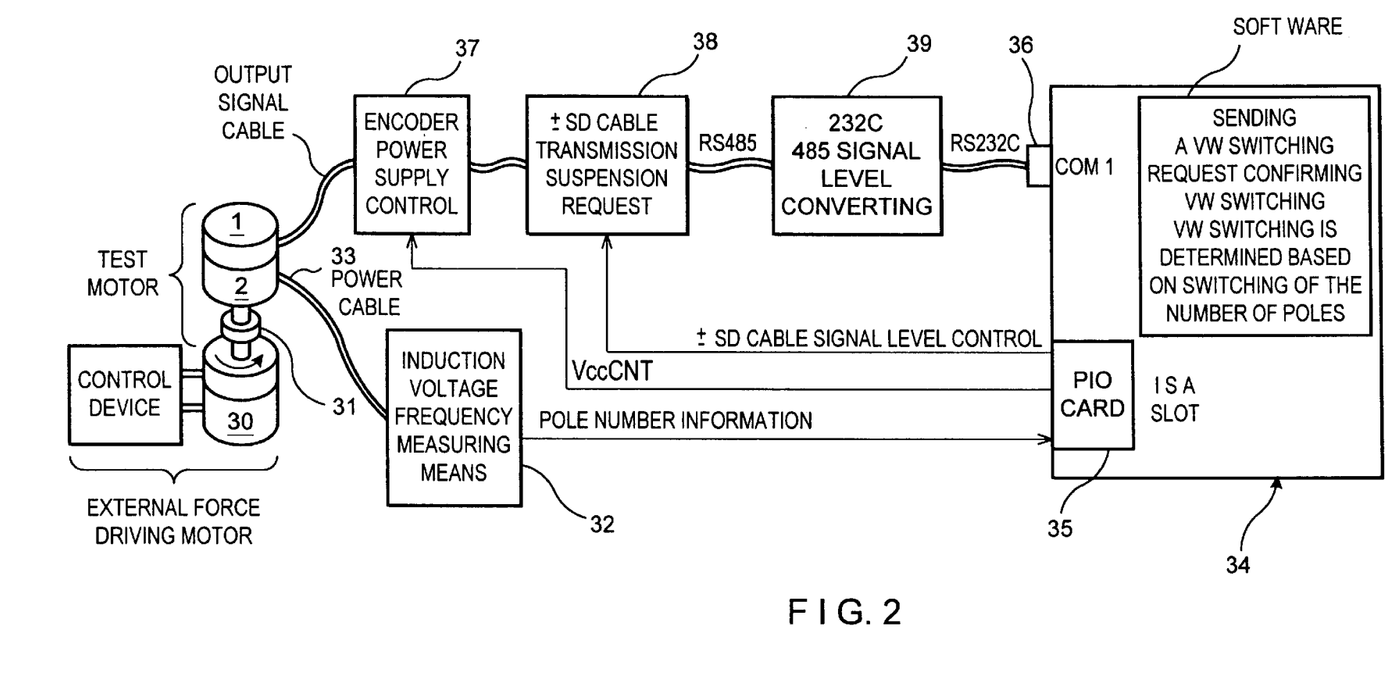
FIG. 2 is a block diagram showing a structure of a parameter establishing device in which various bits of parameter information in an encoder according to an embodiment of the present invention can be established.

The following describes a parameter establishing device in which various bits of parameter information in the above encoder 1 can be established from the outside of encoder 1 in reference to FIG. 2.

As shown in FIG. 2, brushless motor 2 is connected via coupling 31 to an output shaft of external forced driving motor 30 as a motor for testing in order to detect parameter information particular to brushless motor 2 as one bit of parameter information. As a result, parameter information particular to test brushless motor 2, e.g. information regarding the number of poles or induction voltage of brushless motor 2 in this embodiment, is detected by rotating external forced driving motor 30 at a constant speed.

Also, after establishing various bits of parameter information of encoder 1, external forced driving motor 30 is naturally removed from brushless motor 2. Additionally, the parameter establishing device is also removed therefrom, as shown in FIG. 8, such that a control device is connected to encoder 1 and brushless motor 2 via cables.

More specifically, induction voltage frequency measuring means 32, which measures output voltage from a driving magnet, is connected to test brushless motor 2 via power cable 33. In induction voltage frequency measuring means 32, the frequency of an induction voltage signal, which varies according to rotation of brushless motor 2, that is, information regarding the number of poles of brushless motor 2, can be obtained; the detected information therein is fed to PIO card 35 of switching transmission/receiving control means (personal computer).

On the other hand, encoder power supply control means 37, ±SD cable transmission suspension request control means 38 and signal level converting means 39 are connected in series between signal output terminal 14 and power supply terminal 16, and input port 36 (COM1) of switching transmission/receiving control means 34. Encoder power supply control means 37 controls power supply to encoder 1. Also, ±SD cable transmission suspension request control means 38 in this embodiment employs a method to obtain low level signals by controlling a relay and the like such that the output signal cables (±SD cables) are shorted out to the ground cable. A time duration of short-out of the output signal cables (±SD cables) is established to be a short period of time of about 1 m/sec. in order to prevent destroying indefinitely RS485 transceiver 14 on encoder 1. Signal level converting means 39 converts a signal applicable to the standard of input for a personal computer to a signal applicable to the standard of input/output for the encoder, that is, a signal applicable to the RS485 standard. Also, signal level converting means 39 can perform the reversed conversion of the above.

A power supply control signal (VccCONT) is fed from switching transmission/receiving control means 34 via PIO card 35 to encoder power supply control means 37 which controls on/off of power supply terminal 16 (Vcc) of encoder 1. Also, a given level control signal (SDLCNT) is fed from PIO card 35 of switching transmissionlreceiving 34 to ±SD cable transmission suspension request control means 38 which controls the level of the differential signals from the output signal cables (±SD cables).

Switching transmission/receiving control means 34 contains a program to provide a VW switching request signal as an operation command to VW switching circuit 11 in encoder 1 (see FIG. 1) and a VW switching confirmation program to confirm the switching operation of VW switching circuit 11, and a program to give a given switching request signal to external output terminal 14 in encoder 1 if it is determined that VW switching is needed based on information regarding the number of poles.

The following describes an operation to switch parameters of a motor having 4 poles to one of a motor having 2 poles in the above parameter establishing device. First, an operation to suspend transmission from encoder 1 is described for detail in reference to FIG. 5.

Figure 5A:
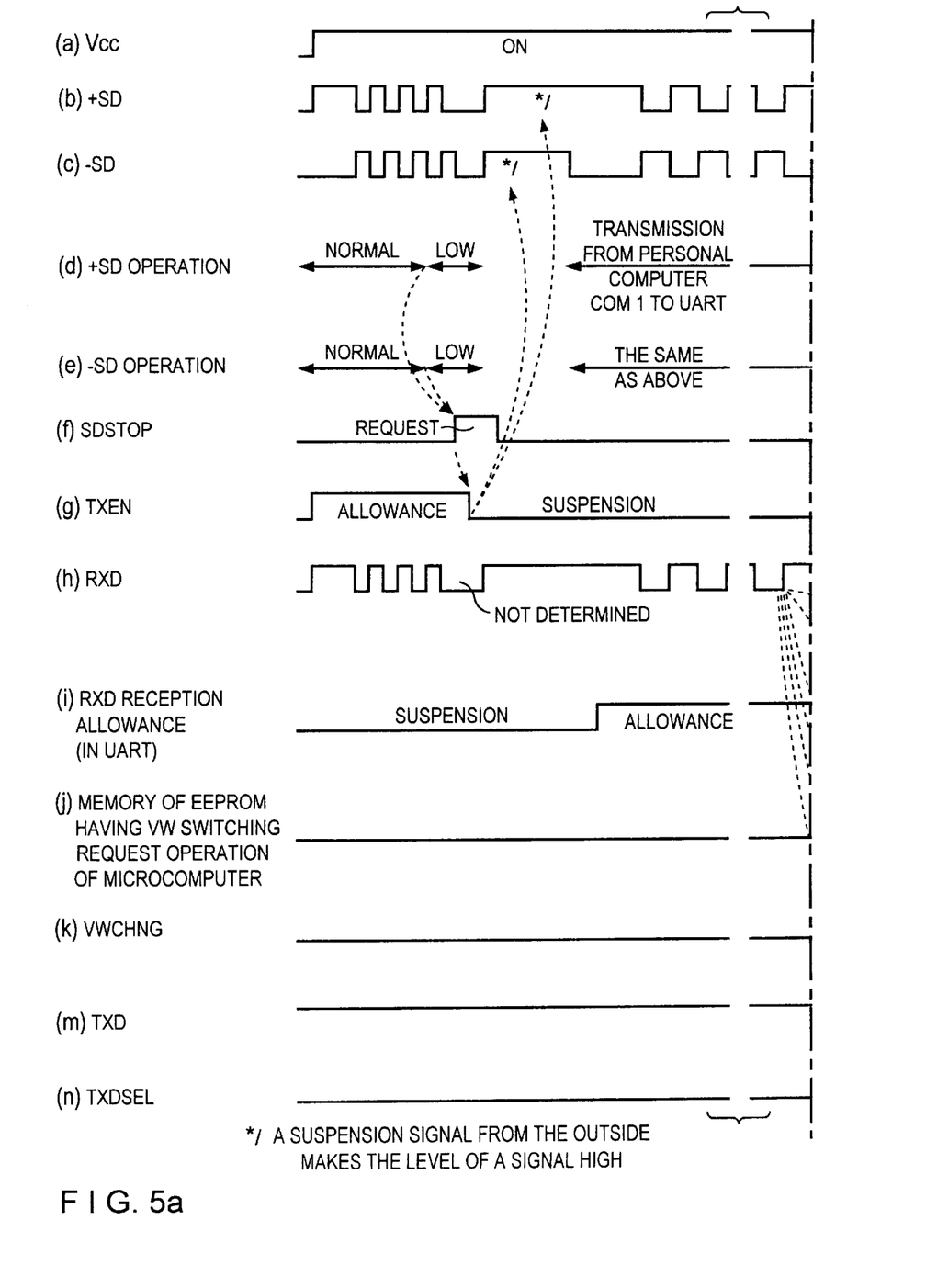
FIG. 5 is a chart showing timings of transmission suspension and parameter switching operations of the present invention.
Figure 5B:
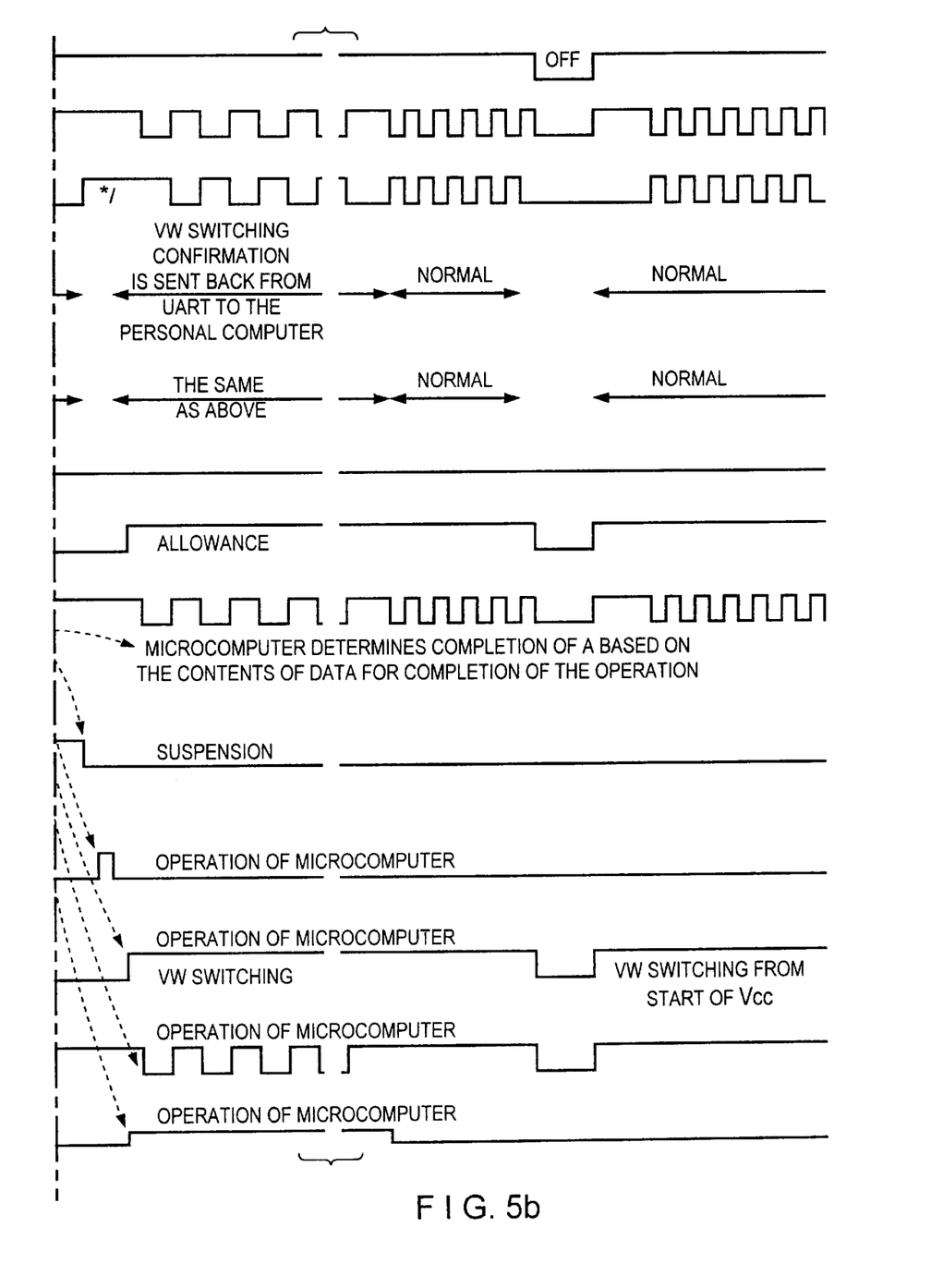

It is supposed that parameter information for a condition that the number of poles of a motor is established as 4 in encoder I although the number of poles of brushless motor 2 is actually 2. First, as shown in FIG. 5 (a), by turning on power supply 16 (Vcc), an encoder serial signal (ED) is provided to the output signal cables (±SD cables) via transmission data switching means 12 and RS485 transceiver 13 as a differential signal as shown in FIGS. 5(b), (c).

In this output condition of the encoder, a ±SD cable operation in FIGS. 5(d), (e) is performed by operating switching transmission/receiving control means 34 (personal computer) located at the outside of encoder 1; as a result, the differential signals from the output signal cables (±SD cables) are forced to be signals at the same low level by output from ±SD cable transmission suspension request control means 38 causing a condition in which the signals are not recognized as transmission signals. Such a condition, in which a signal is not recognized as a transmission signal, is not limited to the above condition with the low level signals caused by short-out in this embodiment. As long as a condition is such that a signal is not recognized as a transmission signal, any conditions, such as the one with high level signals, are applicable.

When low level signals are generated from the output signal cable (±SD cable), transmission suspension request detecting means 21, which monitors the output signal cables (±SD cables), detects the signals. Then, as shown in Figure (f), a transmission suspension request signal (SDSTOP) generated by transmission suspension request detecting means 21 activates an interrupt control program. Due to the interrupt process, as shown in Figure (g), a transmission suspension command (TXEN) is provided from parallel port 20*d* of switching control means 20 to transmission line driver 13*a* in RS485 transceiver 13. Accordingly, as shown in FIGS. 5(*b*), (*c*), differential signals from the output signal cables (±SD cables) are at high impedance such that transmission from encoder 1 is suspended.

In this case, the output signal cable (±SD cable) at high impedance is connected to the power supply (Vcc) via the resistors (15*a*, 15*a*) such that the level of the signals from the ±SD cables becomes high. As a result, noise is prevented from appearing on the output signal cables (±SD cables) in the transmission suspension condition.

Additionally, in order to avoid mistakenly detecting the transmission suspension request signal (SDSTOP) of the encoder signal due to the noise, it is possible that transmission suspension request detecting means 21 detects the number of repetitions of conditions, in which a signal is not recognized as a transmission signal, per unit time or detection is performed by combining more than two pairs of differential signals separately with a mode of signals which are not recognized as transmission signals; as a result, the transmission suspension condition of the encoder signals is more certainly obtained.

The following describes operation to switch parameters in encoder 1 corresponding to a motor having 4 poles to parameters corresponding to a motor having 2 poles in the above transmission suspension condition of the encoder signals in reference to FIG. 5.

First, when test brushless motor 2 having 2 poles is rotated at a constant speed by external forced driving motor 30, brushless motor 2 functions as a power generator such that sine waves are generated in a power cable. The sine waves are received by induction voltage frequency measuring means 32 as alternating voltage wherein the number of poles of brushless motor 2 is measured as 2 based on the frequency. The driving magnet pole number information (POLNUM) is transmitted into switching transmission/receiving control means (personal computer) 34 via PIO card 35 such that the number of poles of brushless motor 2 is determined in switching transmission/receiving control means 34. Then, a request signal corresponding to the pole number information is sent into encoder 1 via the output signal cables (±SD cable).

This pole number information request signal is monitored by receiving line driver 13*b* in RS485 transceiver 13 as a switching request signal (RXD) as shown in FIG. 5(*h*) and entered into switching control means 20 via transmission interface (UART) 20*e*. In switching control means 20, operations shown in FIGS. 5(*l*), (*j*), (*k*), (*m*), (*n*) are conducted in response to the fact that the number of poles of brushless motor 2 is switched.

In this case, the switching request signal (RXD) includes unnecessary signals on the output signal cables (±SD cables) as shown in FIG. 5(*h*). Therefore, as shown in FIG. 5 (I), transmission interface (UART) 20*e* has a mechanism to usually ignore such unnecessary signals by prohibiting transmission such that only signals from switching transmission/receiving control means (personal computer) 34 are allowed to be received. The transmission suspension request signal (SDSTOP) entered into switching control means 20 is to switch prohibition to allowance for transmission of the switching request signal (RXD).

In other words, switching control means 20 determines completion of transmission of the switching request signal (RXD) such that the allowance mode of the switching request signal receiving allowance function in transmission interface (UART) 20*e* is switched to the prohibition mode (see FIG. 5 (I)). As shown in FIG. 5 (*j*), a fact that there is a V, W switching request is stored in memory device (E$^2$PROM) 20*f* as a memory portion; additionally, as shown in FIG. 5(*k*), a V, W switching command (VWCHANGE) signal is transmitted from parallel port 20*d* to V, W switching circuit 11. As a result, switching of a detecting position data signal is conducted (see Table 1).

When the above operations of writing and switching are completed by receiving the switching request signal (RXD), a selection command signal (TXDSEL) is transmitted to transmission data switching means 12 as shown in FIG. 5(*n*). Then, as shown in FIG. 5(*m*), a parameter switching confirmation signal (TXD) is transmitted from transmission interface (UART) 20*e* of switching control means 20 via the output signal cables (±SD cables) to switching transmission/receiving control means 34 outside encoder 1 where it is confirmed that switching of the parameters is complete.

Thereafter, encoder 1 sends out an encoder serial signal (ED) corresponding to a motor having 2 poles after switching the parameters. Also, even when the parameter information is reestablished while the power supply is temporarily turned off, contents of various bits of parameter information after the switching request are stored in memory device (E$^2$PROM) 20*f*. As a result, encoder 1 is started up as for a motor having 2 poles after switching of the parameters and sends out the encoder serial signal (ED).

The above explained the present invention for detail in reference to the embodiments. However, one is not limited to the above embodiments of the present invention; various modifications are applicable within the scope of the objective of the present invention.

For example, in the above embodiment, the number of poles of a motor is selected as one of the various bits of parameter information to be reestablished; however, it is possible to reestablish the following various bits of parameter information in the same manner.

EXAMPLE A

Codes and the like indicating an identification number (ID) and intensity of the encoder in watts.

EXAMPLE B

Codes indicating the manufacturing number, model, manufacturer and manufacturing date of the encoder.

EXAMPLE C

Codes assigning a number pulses per rotation in association with A and B phases of the encoder to reestablish the number of pulses; for example, when an older motor having a ratio of pulses per rotation at 1,000 or 500 is replaced with a new motor having a ratio of pulses per rotation at 2,000, the ratio of pulses per rotation in association with the A and B phases in the encoder can be established.

EXAMPLE D

In the case of an output format, in which a plurality of output formats of encoder serial signals are transmitted by the parallel-to-serial converter in the encoder, the format can be assigned. For example, either a serial signal format of encoder maker A or one of encoder maker B can be selected by a personal computer.

Furthermore, it is possible to form a plurality of parallel-to-serial converters in which the output thereof is switched.

Also, there is only one channel as an output signal cable in the above embodiment, however, one is not limited to this but the present invention is still applicable even when there is a plurality of output channels.

Moreover, the above embodiment described examples of detecting a condition in which a signal is not recognized as a transmission signal, that is, a condition in which signals from the output signal cables (±SD cables) are at the same level of either high or low. However, it is possible to drive the output signal cables (±SD cables) from the outside by combining a high level signal and a low level signal. For example, if the frequency of alternation of low and high signals from the output signal cables (±SD cables) does not exceed 500 ns while a normal encoder signal is transmitted, the output signal cables (±SD cables) are forced to be driven from the outside with signals at the frequency of 250 ns such that the level of a low level signal from the −SD cable is constantly opposite of the level of a high level signal from the +SD cable. As a result, a condition with the normal signal is distinguished from a condition with a signal suspension request from the outside.

As described above, an encoder of the present invention detects a condition in which a differential signal from the encoder is not recognized as a transmission signal according to a transmission suspension request from a parameter establishing device (such as a personal computer) outside the encoder; consequently, the output from the transmitting portion of the encoder is suspended such that parameter switching information from the outside is received in the encoder. Therefore, even when the cover of the encoder is closed, the parameters in the encoder can be reestablished by electric operations from the outside of the encoder such that the same encoder can be used with various motors without replacing the encoder itself or a base. As a consequence, productivity of the encoder is dramatically increased.

Also, the encoder of the present invention detects a condition in which a differential signal from the encoder is not recognized as a transmission signal according to a transmission suspension request from a parameter establishing device (such as a personal computer) outside the encoder; consequently, the output from the transmitting portion of the encoder is suspended such that parameter switching information from the outside is received in the encoder to store a new set of parameter information in the memory portion in the encoder. Therefore, even when the cover of the encoder is closed, the parameters in the encoder can be reestablished by electric operations from outside of the encoder such that the same encoder can be used with various motors without replacing the encoder itself or a base. As a consequence, productivity of the encoder is dramatically increased.

In this case, the above effects can be more certainly obtained by practicing the following; as in the present invention, by using a logic circuit comprised of a transmission suspension request detecting means, whether the differential signal is not recognized as a transmission is certainly detected with a circuit having a simple structure.

Also, the above effects can be more certainly obtained by practicing the following; as in the present invention, a transmission suspension condition is generated by switching the differential signal from the transmitting portion to high impedance such that the signal suspension operation is assured by a simple circuit.

Additionally, the above effects can be more certainly obtained, as in the present invention, by performing overwriting of new parameter information to a memory device, from which and onto which reading and writing are possible, as a memory portion.

Furthermore, in the present invention, completion of overwriting of parameter information is notified to the outside via the transmission data selecting means such that the parameter switching operation is easily confirmed. As a result, the above effects are amplified.

In addition, the above effects are further amplified by certainly obtaining operation with a simple structure using a transceiver means as in the present invention.

Moreover, in the present invention, a condition, in which a differential signal from the transmitting portion is not recognized as a transmission signal, is generated by a transmission suspension request from a parameter establishing device (such as a personal computer) outside the encoder while a new set of parameter information is stored in the memory portion in the encoder upon receipt of parameter switching information from the outside of the encoder. Therefore, even when the cover of the encoder is closed, the parameters in the encoder can be reestablished by electric operations from the outside of the encoder such that the same encoder can be used with various motors without replacing the encoder itself or a base. As a consequence, productivity of the encoder is dramatically increased.

In this case, the above effects can be more certainly obtained by generating a signal, which is not recognized as a transmission signal, by having differential signals at the same level of either high or low as in the present invention such that operation is certainly obtained by a circuit having a simple structure.

Also, in the present invention, parameter information particular to a motor is stored in the encoder by an instruction from the switching transmission/receiving control means outside the encoder; therefore, the above effects can be more certainly obtained.

Further, in the present invention, the fact that the memory portion in the encoder is overwritten with new parameter information is swiftly and readily confirmed by the switching transmission/receiving control means outside the encoder; therefore, the above effects can be more certainly obtained.

While the foregoing description and drawings represent the preferred embodiments of the present invention, it will be obvious to those skilled in the art that various changes and modifications may be made therein without departing from the true spirit and scope of the present invention.

What is claimed is:

1. An encoder comprising:

position detecting means for detecting a magnetic pole position and a rotational position of a motor;

a memory portion for storing parameter information particular to one of said motor and said position detecting means;

a transmitting portion for externally transmitting parameter information particular to said position detecting means as a differential signal;

transmission suspension request detecting means for detecting that said differential signal is driven by a given signal externally provided such that said differential signal does not exist as a transmission signal and for generating a transmission suspension request signal requesting suspension of transmission of said differential signal; and switching control means for switching said transmitting portion to a transmission suspending condition based on said transmission suspension request signal provided by said transmission suspension request detecting means.

2. The encoder described in claim 1 in which said transmission suspension request detecting means constantly monitors an output differential signal from said transmitting portion and comprises a logic circuit for providing said transmission suspension request signal when two of said differential signals become the same level.

3. The encoder described in claim 1 in which said switching control means comprises a control function for providing a suspension command signal to said transmitting portion by receiving said signal of transmission suspension request from said transmission suspension request detecting means and for generating a transmission suspending condition by having an output differential signal from said transmitting portion be at high impedance.

4. The encoder described in claim 1 comprising transmission data switching means for switching an encoder serial signal from said position detecting means to a switching confirmation signal from said switching control means and for providing said switched signal to said transmitting portion wherein said switching control means comprises a function for generating a selection command signal for activating said transmission data switching means to perform a switching operation.

5. The encoder described in claim 1 in which said switching control means includes a memory portion from which and onto which reading and writing are possible.

6. The encoder described in claim 5 in which parameter information from an external signal allowed by a transmission interface is written onto said memory portion according to a control program in a ROM.

7. The encoder described in claim 1 comprising a receiving portion for receiving parameter switching information provided externally wherein said switching control means comprises a function for overwriting stored information in said memory portion with new information based on said parameter switching information provided via said receiving portion.

8. The encoder described in claim 7 in which both of said transmitting portion and said receiving portion are formed in a transceiver.

9. A parameter establishing device for an encoder comprising:
    position detecting means for detecting a magnetic pole position and a rotational position of a motor;
    a memory portion for storing parameter information particular to one of said motor and said position detecting means;
    a transmitting portion for transmitting parameter information particular to said position detecting means as a differential signal to the outside;
    a receiving portion for receiving parameter switching information provided from the outside;
    transmission suspension request detecting means for detecting that said differential signal is driven by a given signal provided from the outside such that said differential signal does not exist as a transmission signal and for generating a transmission suspension request signal requesting suspension of transmission of said differential signal;
    switching control means for switching said transmitting portion into a transmission suspending condition based on said transmission suspension request signal provided by said transmission suspension request detecting means; and
    switching transmission/receiving control means for feeding an operation signal, which controls a condition such that said differential signal from said transmitting portion in said encoder is not recognized as a transmission signal from outside of said encoder.

10. The parameter establishing device for an encoder described in claim 9 in which said switching transmission/receiving control means comprises a circuit which forces said differential signals from transmitting portion in said encoder to be at the same level.

11. The parameter establishing device for an encoder described in claim 9 in which said switching transmission/receiving control means comprises a parameter overwriting control program to provide parameter information, particular to said motor, to said encoder.

12. The parameter establishing device for an encoder described in claim 9 in which said switching transmission/receiving control means comprises a control program to confirm that overwriting of said parameter information is complete.

13. The parameter establishing device for an encoder described in claim 9 comprising:
    induction voltage frequency measuring means for measuring a frequency of an induction voltage signal which varies according to rotation of said motor and for feeding said measuring result to said switching transmission/receiving control means;
    signal level converting means for converting a standard signal for said switching transmission/receiving control means to a standard signal for said encoder;
    output signal transmission suspension request means for changing a condition such that said differential signal from said encoder is not recognized as a transmission signal based on a command from said switching transmission/receiving control means; and
    encoder power supply control means for controlling power supply to said encoder.

14. An encoder comprising:
    position detecting means for detecting a magnetic pole position and a rotational position of a motor;
    an encoder internal signal processor circuit which is formed inside said encoder for processing various detection signals from said position detecting means;
    an external output terminal to which a cable is connected such that output signals processed in said encoder internal signal processor circuit are provided to the outside;
    wherein said encoder internal signal processor circuit comprises:
    transceiver means for enabling transmission of said output signals by being connected to said external output terminal and for enabling receiving of external signals from outside of said encoder;
    transmission suspension request detecting means for constantly monitoring said external signal such that a transmission suspension request signal, for requesting suspension of transmission of a signal from said encoder, is generated when a signal indicating a condition, in which said external signal is not recognized as a transmission signal, is received; and
    switching control means for switching a transmission condition of said transceiver means to a transmission suspension condition according to said transmission suspension request signal.

15. The encoder described in claim 14 in which said transmission suspension request detecting means comprises a logic circuit for generating said transmission suspension request signal by detecting a signal which is not recognized as said transmission signal.

16. The encoder described in claim 14 in which said switching control means comprises a memory portion to store various bits of parameter information particular to said motor or said encoder.

17. The encoder described in claim 16 in which said memory portion is a memory device which can store memory even when a power supply is turned off wherein contents therein can be read out and overwritten as many times as desired.

18. A parameter establishing device for an encoder which is capable of establishing various bits of parameter information of said encoder from the outside of said encoder via a cable connected to an external output terminal of said encoder wherein said parameter establishing device comprises:

output signal transmission suspension request control means for generating a signal, which is not recognized as said transmission signal, by controlling said output signal provided from said encoder; and switching transmission/receiving control means for generating a transmission suspension request signal requesting suspension of transmission said output signal in said encoder based on a signal from said output signal transmission suspension request control means and various bits of parameter information stored in said memory portion of said encoder and for providing switching information for said various bits of parameter information to the inside of said encoder.

19. The parameter establishing device for an encoder described in claim 18 comprising:

signal level converting means for converting a standard signal for said switching transmission control means to a standard signal for said encoder; and encoder power supply control means for controlling power supply to said encoder.

* * * * *